United States Patent Office.

ALFRED EINHORN, OF MUNICH, GERMANY, ASSIGNOR TO THE FARBWERKE, VORMALS MEISTER, LUCIUS & BRÜNING, OF HÖCHST, GERMANY.

ESTER OF PARAÄMIDOMETAOXYBENZOIC ACID.

SPECIFICATION forming part of Letters Patent No. 610,348, dated September 6, 1898.

Application filed November 10, 1897. Serial No. 658,038. (Specimens.) Patented in England May 17, 1897, No. 12,179, and in France July 8, 1897, No. 256,225.

*To all whom it may concern:*

Be it known that I, ALFRED EINHORN, doctor res. nat. and professor of chemistry, a citizen of the Empire of Germany, residing at Munich, Germany, have invented certain new and useful Improvements in the Manufacture of Esters of Paraämidometaoxybenzoic Acids, (for which patents have been granted in England, No. 12,179, dated May 17, 1897, and in France, No. 256,225, dated July 8, 1897,) of which the following is a specification.

This invention relates to the production of esters of paraämidometaoxybenzoic acids.

I have found that by heating paraämidometaoxybenzoic acid with mineral acids in presence of alcohols the esters of such acids may be obtained. These compounds are valuable as medicaments, as they produce, like cocaine, local insensibility.

The process for the manufacture of these new compounds is shown by the following example: Ten kilograms of the hydrochlorid of paraämidometaoxybenzoic acid obtained by reducing paranitrometaoxybenzoic acid of the melting-point 230° centigrade are treated with forty kilograms of methyl alcohol and ten kilograms of concentrated sulfuric acid and brought to boil for six to seven hours. On cooling, the ester contained in the solution may be separated with concentrated hydrochloric acid as hydrochlorid. The latter is dissolved in water, from which the free amidoöxybenzoic-acid ester is separated by means of sodium acetate.

The ester thus obtained crystallizes in laminæ, melting at 120° to 122° centigrade, easily soluble in hot water, alcohol, and ether, but soluble with difficulty in cold water and benzene.

The new compound is used in the form of powder for dressing wounds or in the form of ointment.

The ethyl ester obtained in the same way with ethyl alcohol exhibits similar solubilities and melts at 98° centigrade.

Having thus described my invention, what I claim is—

1. Process for manufacture of the esters of paraämidometaoxybenzoic acids by heating the latter in alcoholic solution with mineral acids, substantially as described.

2. As a new product, the ester derived from paraämidometaoxybenzoic acid and methyl alcohol, being a white crystalline product, melting at 120° to 122° centigrade, easily soluble in hot water, alcohol and ether, but soluble with difficulty in cold water and benzene, substantially as set forth.

In testimony that I claim the foregoing as my invention I have signed my name in presence of two subscribing witnesses.

ALFRED EINHORN.

Witnesses:
  EMIL HENZEL,
  YORN BERTHLETT.